3,531,438
PROCESS FOR THE STEPWISE HARDENING OF UNSATURATED POLYESTERS

Hermann Schnell, Krefeld-Urdingen, and Hans Rudolph and Klaus Prater, Krefeld-Bockum, Germany, assignors to Farbenfabriken Bayer Aktiengesellschaft, Leverkusen, Germany, a corporation of Germany
No Drawing. Filed June 30, 1965, Ser. No. 468,606
Claims priority, application Germany, Aug. 8, 1964,
F 43,711
The portion of the term of the patent subsequent to Apr. 11, 1984, has been disclaimed
Int. Cl. C08g 17/10, 17/12
U.S. Cl. 260—75      3 Claims

ABSTRACT OF THE DISCLOSURE

Production of a gel stage prepolymer from an unsaturated polyester by heating a monomer-free unsaturated polyester in the presence of a catalytic amount of a catalyst of the formula

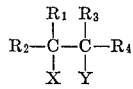

wherein $R_1$ and $R_3$ are phenyl radicals, $R_2$ is hydrogen, methyl or phenyl, $R_4$ is methyl or phenyl and X and Y are hydroxyl, amino, halogen, benzoxy or phenoxy or together with the adjacent carbon atoms complete a cyclic carbonate or sulfite moiety, until a gel stage prepolymer is obtained and then interrupting said heating and cooling the gel stage prepolymer to room temperature, said gel stage prepolymer being useful for the production of moulded articles on further heating.

---

It is known to use liquid, peroxide-containing moulding masses of mixtures of unsaturated polyesters and of monomeric compounds copolymerizable therewith for the production of filled moulded masses. However, for many purposes of application, the tackiness of the masses obtained is disturbing; it is not possible for example to produce from them friable moulding masses. Furthermore, it is very disadvantageous that the peroxide-containing moulding masses possess in general, only a limited storability and often harden after only a few weeks.

Peroxide-containing, monomer-free, unsaturated polyesters have already been proposed as binding agents. Such polyesters, admittedly, yield masses with a reduced tackiness after the addition of conventional fillers. In the customary hot working up, however, they only polymerize to give hardened products of low value.

The object of the present invention is a process for the production of moulded articles made from unsaturated monomer-free polyesters with a content of polymerization catalysts, which is characterized in that the unsaturated polyesters, possibly in the presence of conventional fillers, are prepolymerized to the gel stage by heating, cooled and the prepolymers obtained hardened at any later time by reheating while moulding.

This method of procedure is especially noteworthy in that the prepolymerization which is initiated by warming, can be interrupted, without difficulty, at the desired moment by merely cooling, and that thus products result which are not only storable and—at least in the presence of the usual fillers—are tack-free, but which yield moulded articles with outstanding properties and limited shrinkage by the final hot processing under conventional conditions.

By unsaturated polyesters in the meaning of the invention, there are to be understood the usual polycondensation products which consist of ester-like linked radicals of polybasic, especially dibasic, carboxylic acids and of polyhydric, especially dihydric, alcohols, besides possibly also of radicals of monohydric alcohols and/or monobasic carboxylic acids, whereby the radicals must contain, at least partially, polymerizable unsaturated groups, such as, for example, the radicals of $\alpha,\beta$-unsaturated dicarboxylic acids.

Examples of acids are, inter alia, maleic acid, fumaric acid, itaconic acid, mesaconic acid, citraconic acid, succinic acid, glutaric acid, adipic, acid, phthalic acid, tetrachlorophthalic acid, hexachloro-endomethylene-tetrahydro-phthalic acid, trimellitic acid, benzoic acid, linseed oil fatty acid and dehydrated castor oil fatty acid. Examples of alcohols are, inter alia, ethylene glycol, diethylene glycol, propane-, butane- and hexane-diols, trimethylolpropane, pentaerythritol, butanol, tetrahydrofurfuryl alcohol, allyl alcohol and butylglycol. There may also be mentioned unsaturated polyesters which, apart from the radicals of $\alpha,\beta$-unsaturated dicarboxylic acids, also contain $\beta,\gamma$-unsaturated ether radicals, such as, e.g., the radicals of glycerol- or trimethylol-propane mono- and/or diallyl ether or of pentaerythritol mono-, di- and/or triallyl ether as described, for example in the U.S. patent specification No. 2,852,487.

Although the concurrent use of inhibitors is not necessary, the addition of known inhibitors, e.g., of p-benzoquinone, 2,5-di-tert-butyl-quinone, hydroquinone, tert.-butyl-pyrocatechol and 4-ethyl-pyrocatechol, as well as of copper compounds and hydroxylamine derivatives, is not to be excluded.

Polymerization catalysts in the meaning of the invention are the known peroxides, preferably the somewhat more stable types, such as, for example, tert.-butyl hydroperoxide, di-tert.-butyl peroxide, tert.-butyl perbenzoate, dicumyl peroxide, etc. In some cases thre are especially advantageous 1,2-substituted ethanes of the general formula:

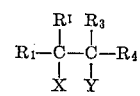

in which $R_1$ and $R_3$ signify aromatic, especially phenyl radicals, $R_2$ signifies hydrogen or an aliphatic or aromatic radical, especially a phenyl radical, $R_4$ signifies an aliphatic or aromatic radical, especially a phenyl radical, and X and Y signify a possibly blocked hydroxyl group and/or a possibly substituted $NH_2$ group and/or halogen.

The typical representatives of these ethane derivatives are benzpinacone and its nuclear substitution products; as further compounds belonging to this class of materials, there may be mentioned: benzpinacone mono- and dialkyl ethers, benzpinacone mono- and diphenyl ethers, the cyclic carbonate of benzpinacone and benzpinacone dibenzoate, furthermore, acetophenone-pinacone and its cyclic sulphite, xanthone-pinacone and fluorenone-pinacone, furthermore, 1,2-di-(3-pyridyl)-1,2-diphenyl-ethane-1,2-diol, 1,2-dichlorotetraphenyl-ethane, triphenyl-glycol and triphenyl-ethanolamine.

These nonperoxide catalysts are especially suitable for the process according to the invention since they do not have the known disadvantages of the peroxides, such as ready inflammability, explosiveness and allergic irritability; their greater stability at room and moderately elevated temperature, moreover, permits the production of masses with especially high storage stability.

The unsaturated polyesters can, furthermore, contain all other technically known additives, such as, e.g., magnesium oxide, chalk, powdered slate, talc, dolomite, barite, dyestuffs, fabrics or fibres of glass, synthetic resins or textile products, compounds which ensure the protection against light, heat or burning, etc. These substances are expediently added before or during the prepolymerization.

The prepolymerization according to the invention is expediently carried out in heatable stirring devices, kneaders, worms or roller apparatus. The conversion into the gel state manifests itself, even in highly filled masses, by a characteristic, readily recognizable alteration in consistency of the masses so that it presents no difficulty to break off the heating at the right time.

Further details are to be gathered from the following examples, which are given for the purpose of illustrating the invention.

EXAMPLE 1

An unsaturated polyester is produced by the condensation of 265 parts by weight of maleic anhydride, 44 parts by weight of phthalic anhydride and 197 parts by weight of ethylene glycol until the acid number is 22.

800 parts by weight of this product are treated under nitrogen, together with 800 parts by weight of dolomite, 32 parts by weight of zinc stearate, 16 parts by weight of magnesium oxide and 16 parts by weight of tert.-butyl perbenzoate, in a kneader heated with steam at 100° C. After kneading for about 30 minutes, gelling starts, whereby the originally viscous mixture solidifies and finally decomposes in the form of granules. After cooling to room temperature, the prepolymer is comminuted to a particle size of 3–4 mm. in a cross beater mill.

280 parts by weight of the friable mass so obtained are moulded at 145° C. and a pressure of 30 metric tons for 4 minutes in a standard device (DIN 53470, for the production of standard rods). The standard rods obtained possess the following properties:

Martens degree—140° C.
Bending strength—630 kp./cm.²
Impact bend strength—6.3 cm. kp/cm.²

EXAMPLE 2

An unsaturated polyester is produced by the condensation of 241 parts by weight of maleic anhydride, 67 parts by weight of phthalic anhydride and 191 parts by weight of ethylene glycol until the acid number is 30.

1000 parts by weight of this material are treated in a kneader under the conditions described in Example 1, together with 1000 parts by weight of dolomite, 40 parts by weight of zinc stearate, 20 parts by weight of magnesium oxide and 40 parts by weight of benzpinacone. The prepolymerization, carried out up to gelling, yields at room temperature an excellent friable mass from which there are obtained in a standard device (DIN 53470, for the production of standard rods) at 165° C. and a pressure of 30 metric tons in 4 minutes, standard rods with the following properties:

Martens degree—140° C.
Bending strength—450 kp./cm.²
Impact bend strength—3.5 cm. kp./cm.²

The moulding procedure when repeated after 5 months storage of the prepolymer, gives equally favourable results.

What we claim is:

1. A process for producing a gel stage prepolymer from an unsaturated polyester which is the condensation product of an α,β-unsaturated dicarboxylic acid and a polyhydric alcohol and which is free of other copolymerizable monomers, said process comprising the steps of heating said monomer-free, unsaturated polyester in the presence of a catalytic amount of a catalyst of the formula

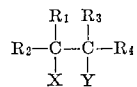

wherein $R_1$ and $R_3$ are phenyl radicals, $R_2$ is hydrogen, methyl or phenyl, $R_4$ is methyl or phenyl and X and Y are hydroxyl, amino, halogen, benzoxy or phenoxy or together with the adjacent carbon atoms complete a cyclic carbonate or sulphite moiety, until the monomer-free, unsaturated polyester is a gel stage prepolymer; interrupting said heating and cooling said gel stage prepolymer to room temperature.

2. The gel stage prepolymer produced by the process of claim 1.

3. A moulded article obtained by moulding the gel stage prepolymer produced by the process of claim 1 under heat and pressure.

References Cited

UNITED STATES PATENTS

| | | | |
|---|---|---|---|
| 2,195,362 | 3/1940 | Ellis | 260—75 |
| 2,340,109 | 1/1944 | D'Alelio. | |
| 2,435,429 | 2/1948 | Evans et al. | 260—75 |
| 2,448,585 | 9/1948 | Fuller. | |
| 3,089,863 | 5/1963 | Hicks et al. | |
| 3,313,863 | 4/1967 | Schnell et al. | 260—861 |

FOREIGN PATENTS 6403575   10/1964   Netherlands.

WILLIAM H. SHORT, Primary Examiner

L. P. QUAST, Assistant Examiner

U.S. Cl. X.R.

26—76, 77; 260—22, 40